United States Patent
Robinson

(10) Patent No.: US 7,355,796 B2
(45) Date of Patent: Apr. 8, 2008

(54) AUTOMOBILE WINDSHIELD FOR HUD SYSTEM

(75) Inventor: Michael G Robinson, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 93 days.

(21) Appl. No.: 11/160,810

(22) Filed: Jul. 11, 2005

(65) Prior Publication Data

US 2006/0023315 A1    Feb. 2, 2006

Related U.S. Application Data

(60) Provisional application No. 60/589,441, filed on Jul. 19, 2004.

(51) Int. Cl.
G02B 27/14    (2006.01)
G03H 1/00     (2006.01)

(52) U.S. Cl. .......................... 359/630; 359/13

(58) Field of Classification Search ............... 359/630, 359/13
See application file for complete search history.

(56) References Cited

U.S. PATENT DOCUMENTS

| | | | |
|---|---|---|---|
| 6,636,370 B2 * | 10/2003 | Freeman | 359/894 |
| 6,654,070 B1 * | 11/2003 | Rofe | 349/11 |
| 6,744,478 B1 * | 6/2004 | Asakura et al. | 349/11 |
| 6,878,425 B1 * | 4/2005 | Gomes | 428/40.1 |
| 6,993,872 B2 * | 2/2006 | Katsuragawa | 52/173.3 |
| 7,123,418 B2 * | 10/2006 | Weber et al. | 359/630 |

\* cited by examiner

*Primary Examiner*—Jordan Schwartz
*Assistant Examiner*—James C Jones
(74) *Attorney, Agent, or Firm*—Baker & McKenzie LLP

(57) ABSTRACT

A simple reflecting layered structure is disclosed that is attached to, or incorporated into, an automobile windshield that allows a head-up-display (HUD) to be viewed through anti-glare, p-polarized sunglasses without double imaging and without substantial net alteration of the polarization state of light. The invention relies on the negligible reflection of p-polarized light at material interfaces oriented at the typical angles within an automobile HUD system. The reflecting structure consists of two polarization manipulating films sandwiching a s-polarized reflector. A suitable reflector could constitute the natural reflection off interfaces between the two films and a single medium of substantially different refractive index. One embodiment utilizes two stretched polymer half wave retardation films separated with an air gap. The optic axes of the films are essentially crossed oriented at approximately 45° to both s- and p-polarization axes.

17 Claims, 3 Drawing Sheets

AUTOMOBILE WINDSHIELD FOR HUD SYSTEM

CROSS-REFERENCE TO RELATED APPLICATIONS

This application claims the benefit of U.S. Provisional Application Ser. No. 60/589,441, filed on Jul. 19, 2004, entitled "Automobile Windshield for HUD System," which is commonly assigned with the present application and incorporated herein by reference in its entirety for all purposes.

TECHNICAL FIELD

Disclosed embodiments herein relate to automotive windshield modifications for controlling optical polarization as part of a head-up display (HUD) system in order to avoid multiple reflections, viewing problems with sunglasses, and imaging glare through the windshield.

BACKGROUND

Head-up displays in automobiles allow a driver to view information off the windshield in the form of a virtual image situated in space above the hood of the car. A projection display situated behind the steering wheel creates the image that projects light onto the windshield, which then reflects the light towards the driver. To create a single image with no ghosts, the windshield should reflect at a single surface with minimal reflection at all other surfaces. With conventional windshields, there is a problem in that they reflect off both front and back surfaces with equal efficiency. One method of avoiding multiple images involves creating a wedge in the windshield thereby superimposing two images formed by two reflections as disclosed in U.S. Pat. No. 6,636,370. While this may be effective with low-resolution images, the disclosed approach suffers in maintaining sufficient image registration over the entire viewing pupil for higher resolution images.

Another issue concerning windshield reflection relates to polarization sensitivity. Typical windshields are angled in such a way as to deflect the projected light at an incidence angle close to Brewster's angle, whereby the reflection of p-polarized light becomes effectively zero. For this reason, s-polarized light has been favored. However, this approach renders the HUD system ineffective for use by a driver wearing anti-glare, p-polarized sunglasses. U.S. Pat. No. 6,744,478 and related patents by the same inventors consider the problem of multiple reflections and disclose methods of creating a single reflecting surface by altering the polarization state of the projected light between the first and last surfaces of the windshield. However, these disclosures do not show, teach or suggest the advantageous embodiments of the present application.

The described embodiments of this application offer low-cost, windshield designs for HUD systems that reflect projected light off a substantially single interface with p-polarized light being transmitted and reflected with minimal change in its polarization state. Creating a windshield that reflects projected light from a single surface whose polarization is eventually p-polarized is an attractive solution because of some of the issues described above.

SUMMARY

Disclosed embodiments involve two polarization manipulating films surrounding a single s-polarized reflecting thin film layer that substantially transmits p-polarized light. A conventional glass windshield can in principle come before, after, or between any of the three layers depending on the specific embodiment. The principle of the embodiments is as follows.

First considering the projected light of the HUD system. A light is required to be p-polarized before encountering the first polarization manipulating layer. Being p-polarized, the light traverses into the material of the first layer without substantial reflection. On exiting the first layer, the light is now s-polarized, having been transformed by this first layer. And as such, the converted s-polarized light will reflect off any interface between the layers that have substantial differences in refractive index. At some point between the first and second layers, there will be an interface sufficiently close together as to not substantially separate the reflected beams so as to be noticeable by the driver. This interface can surround an air gap or a thin film of low or high index material, including the possibly of a thin metal layer. The reflected portion of the projected light then travels back through the polarization manipulating layer and is substantially transformed back into its original p-polarized states to be viewable through anti-glare sunglasses. The transmitted portion of the projected light then encounters a second polarization manipulating layer, which then transforms its polarization state back to "p" allowing it to exit from the windshield without any further substantial reflection.

Second, we consider the external light that passes through the windshield and form the view of the world as seen by the driver. This light is effectively unpolarized ambient light apart from the strongly s-polarized light associated with high angle specular reflection, or the so-called glare. This light passes, substantially unaltered in polarization, through conventional windshields to be viewed by the driver as if the windshield was not present. In this way, p-polarizing sunglasses worn by the driver would suppress the glare within the image. In the case of the above disclosure, this light now traverses through two offsetting polarization manipulating films and a reflector thin film layer, which attempts to attenuate its non-glare p-polarization component, does not essentially alter the final polarization state of either polarization component allowing anti-glare glasses to suppress the glare as desired.

DETAILED DESCRIPTION OF THE PREFERRED EMBODIMENTS

Figure 1:
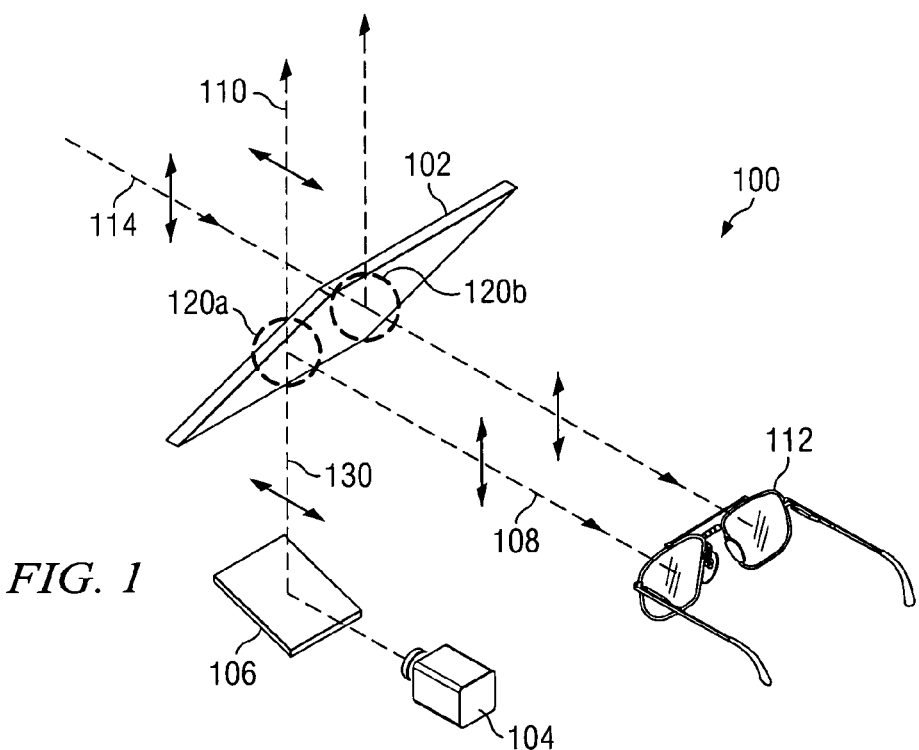
FIG. 1 illustrates an embodiment of using two layers of polarization manipulating film separated by a layer of reflecting thin film with substantially different refractive index for reflecting s-polarized light.
Figures 1A, 1B:
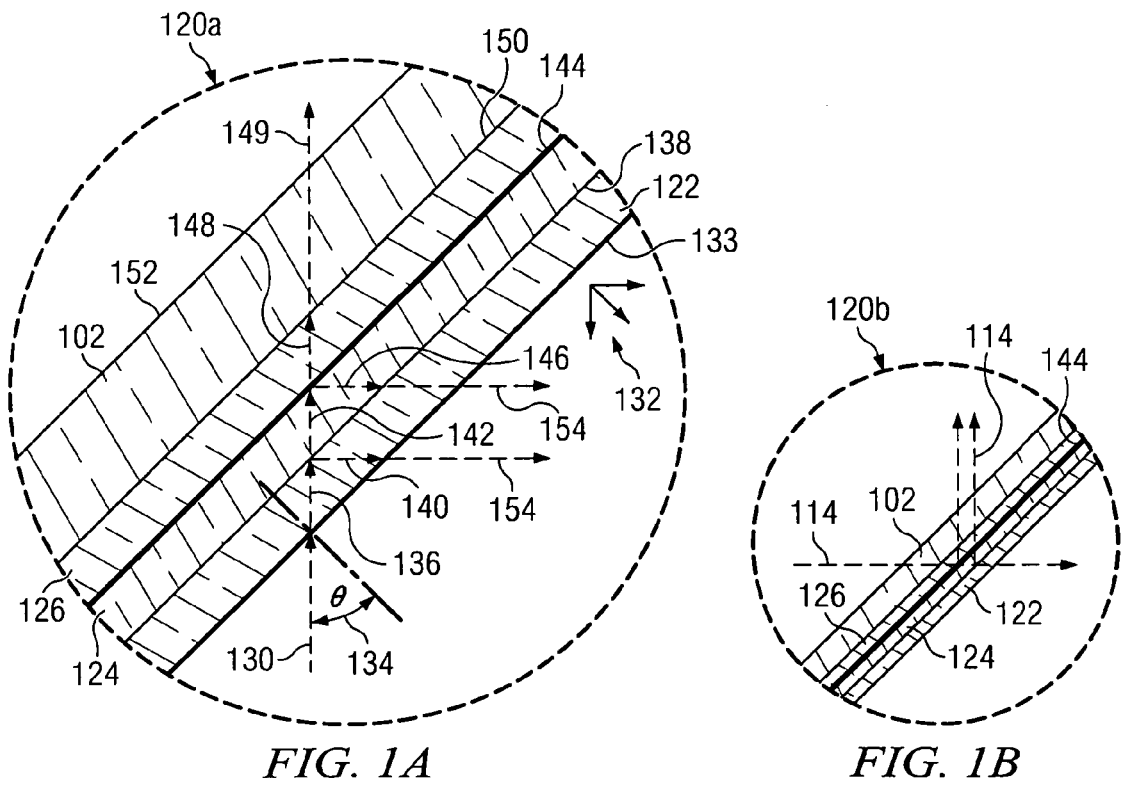

FIG. 1 illustrates a modified automobile windshield 102 for manipulating optical polarization in a head-up display (HUD) system 100. A projector 104 is projecting p-polarized light off a fold mirror 106 and onto the windshield 102, which reflects 108 and transmits 110 a portion of the projected light 130. The projector 104 may also project s-polarized light or unpolarized light. For p-polarized light 130, a driver wearing the proper anti-glare (p-polarized) sunglasses 112 may receive the reflected light 108. This is accomplished without having to form double images and avoiding multiple reflections from different material surfaces and interfaces as previously discussed.

Additionally, incoming light transmitted from outside the windshield 114 retains its polarization state thereby allowing the driver to avoid glares by virtue of his p-polarized sunglasses 112. The substantially unpolarized external light 114 may come from ambient light sources or sunlight. The polarization manipulation mechanisms are shown in the enlarged circle FIGS. 120a, 120b. In general, both circle FIGS. 120a, 120b illustrate a first polarization manipulating layer 122, a reflecting thin film layer 124, and a second polarization manipulating layer 126, all bonded with index-matched adhesives (not shown) to a conventional windshield 102. In a preferred embodiment, the optic axes of the two films 122, 126 are substantially orthogonal to each other and at approximately 45° degrees to the s- and p-polarization axes.

We first consider the manipulation of projected light 130 from the projector 104 in circle FIG. 120a. Unwanted reflections 132 at an initial surface 133 of the first polarization manipulating film 122 may be suppressed by projecting p-polarized light 130 at an angle (θ) 134 close to Brewster's angle. The p-polarized light's 130 state of polarization (SOP) is then transformed by propagating through the first polarization manipulating layer 122 into a substantially s-polarized light 136. On exiting the first polarization manipulating film 122, the converted s-polarized light 136 encounters a first material interface 138 between the first polarization manipulating film 122 and the adjacent reflecting thin film 124 that results in a percentage of the s-polarized light 136 being reflected back into the first film 122 in the form of a first-reflected beam 140. The reflection is as a result of the difference in material composition and index of refraction between the two layers 122, 124 causing light to bend and reflect. The un-reflected portion of s-polarized light 142 then continues through the thin film 124 and encounters a second material interface 144 prior to entering the second polarization manipulating film 126. Consequently, there will be a second-reflected beam 146 as a result of the difference in refractive index as previously described.

The s-polarized light from the second-reflected beam 146 may be added to the s-polarized light of the first-reflected beam 140 when the distance between the two polarization manipulating films 122, 126 are substantially larger than the wavelength of light. In other words, the reflected beams 140, 146 may be combined when the thickness of the reflecting thin film 124 is substantially larger than the wavelength of the projected light 130 from the projector 104. In the case of the thin film 124 having a low index material (e.g. air) or a high index material (e.g. TiO$_2$), the addition of the two reflections 140, 146 may be close to 15%. The thickness of the thin film 124 should be minimized (e.g. less than about 0.1 mm) to avoid ghosting within the projected image. In the case having evaporated TiO$_2$ as the thin film material 124, optical interference would drive a certain thickness to maximize the reflectivity at a desired central color.

The remaining non-reflected s-polarized light 148 subsequently passes through the second polarization manipulating layer 126, and is converted to being essentially p-polarized light 149, which then passes through all further materials 102 and interfaces 150, 152 with minimal reflections. Likewise, the first-reflected beam 140 returning through the first polarization manipulating film 122 is also being transformed back to being predominantly p-polarized by the same principle as previously discussed. The beam 154 then exits without further reflection and heads toward the driver who is able to view the projected image formed by the light through his anti-glare, p-polarized sunglasses. The second-reflected beam 146 may also be converted to predominantly p-polarized by the same principle.

Next, we consider external ambient light 114 generally from the outside world in circled FIG. 120b. The light 114 is essentially unpolarized in nature, but contains glare in the form of low angle specular-reflected light components that are predominantly s-polarized. To minimize the glare to the driver, the polarized components of the light must be maintained, which is the case as it passes through the dual polarization manipulating films 122, 126.

The p-polarized component of the ambient light 114 will be transformed temporarily to s-polarized light as it enters the second polarization manipulating film 126 through the windshield 102. Reflections may be generated away from the driver at the same level as that of the ambient light 114 as a result of the second material interface 144. After traveling through the reflecting thin film layer 124, the light 114 then returns to p-polarization as a result of the first polarization manipulating film 122 to be viewed by the driver as desired. The effect of the internal reflections may cause the region where the film 126 is attached to the windshield to be slightly darker than its surroundings. Without sunglasses (e.g. at night), the relative darkness of this region is reduced by a factor of two, since s-polarized light would be similarly attenuated in the display region as the rest of the windshield 102.

Figure 2:
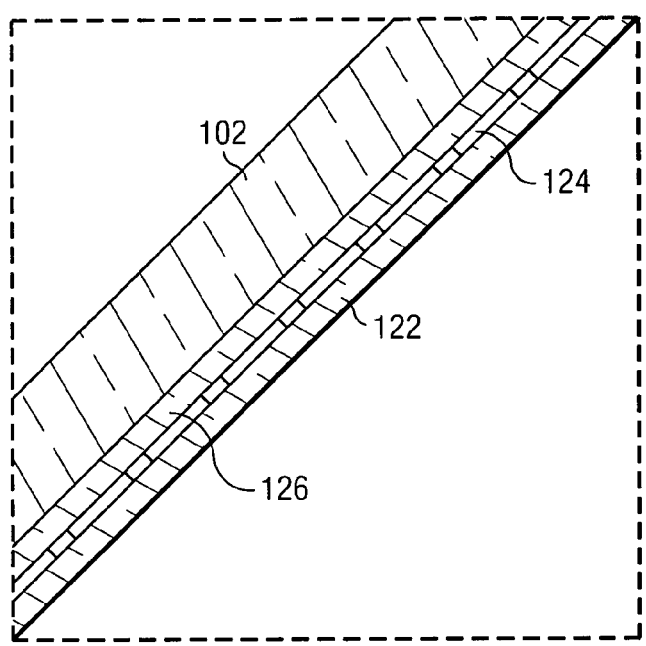
FIG. 2 illustrates an embodiment whereby two half wave stretched polymer films separated by an air space are laminated to a conventional windshield.
Figure 3:
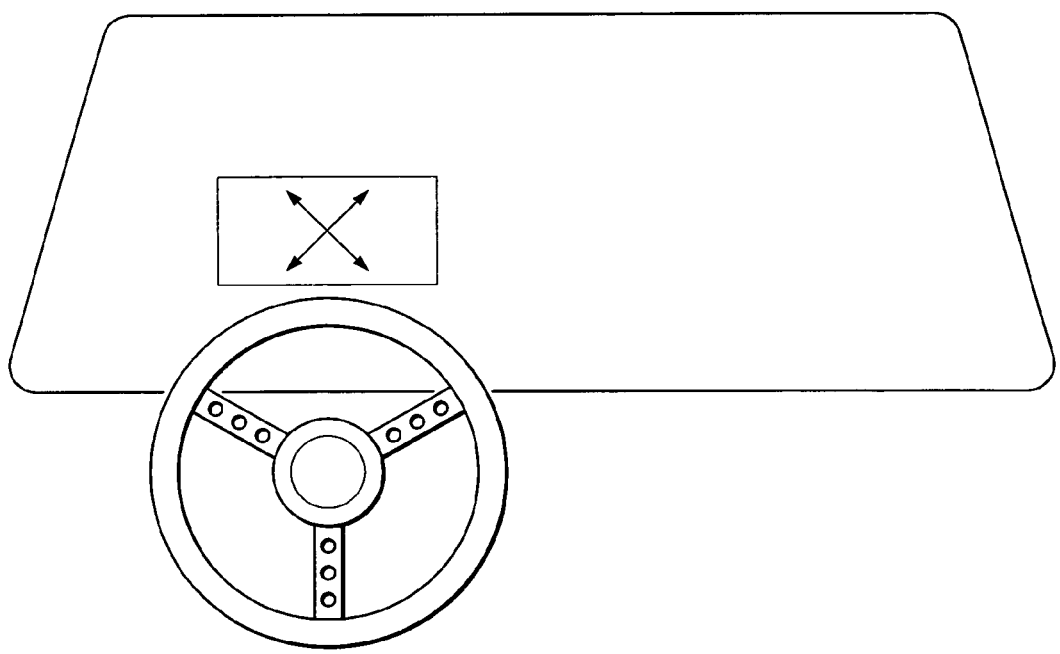
FIG. 3 illustrates the orientation of the two half wave stretched polymer films of FIG. 2 as viewed from the driver's perspective.

Subsequent figures constitute embodiments of the basic disclosure that uses certain films and reflecting means in different planes with respect to the windshield. FIG. 2 represents another embodiment with both polarization manipulating films 122, 126 each having a single stretched polymer having a half wave retardance at a suitable wavelength (e.g., green ~540 nm for full-color displays). The films 122, 126 may then be oriented such that their optic axes are crossed as illustrated in FIG. 3, so that they negate each other in a single pass and substantially transform s-polarization to p-polarization (and p to s) in a single pass of either film. The extent to which they are crossed and oriented with respect to the projected polarization axis is dependent on second-order geometric effects. In another embodiment, instead of having a reflecting thin film 124, an air space layer 124 may be maintained in between the two films 122, 126 as illustrated in FIG. 2. The air space layer 124 is maintained by suitable spacers, such as beads or fibers, which may also act to locally attach the two films 122, 126. The air space could be between 0.01 and 0.1 mm in thickness to ensure addition of reflections without interference, and avoid significant parallax problem (double imagery) at the same time. Reflection of s-polarized light at the film/air interfaces 126/124, 124/122 would be at a level between 10 and 20%, consistent with the demands of the system.

Figure 4:
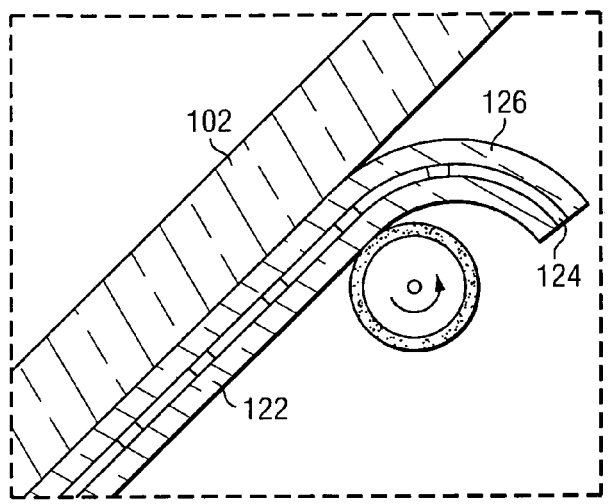
FIG. 4 illustrates an embodiment whereby two polarization manipulating films separated by a high refractive index material may form a single laminate and be attached to a conventional windshield.

FIG. 4 shows an embodiment in which the reflecting interfaces are between a central high index material allowing potentially free standing film to be realized (as of course could a stabilized air spaced version). Such a film could then be retrofitted to current automobile windshields with minimal cost and difficulty. This type of laminate film could allow simple, direct-view LCD displays to be viewed off the windshield with the attributes so far discussed. LCD displays of this nature could also be retrofitted to existing cars.

Figure 5:
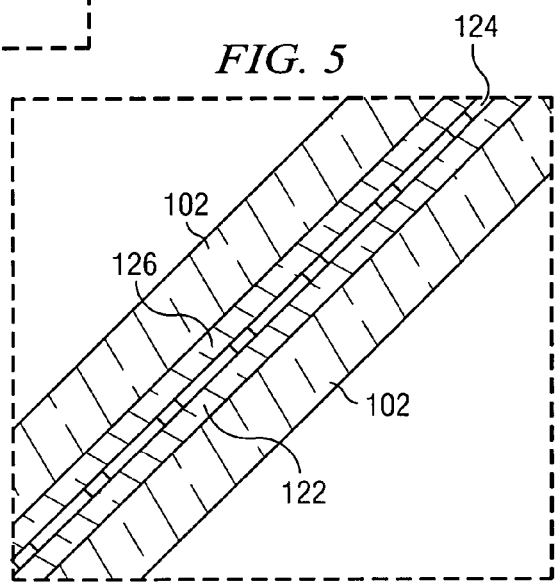
FIG. 5 illustrates an embodiment whereby stretched polymer films separated by an air space are laminated within a glass windshield.
Figure 6:
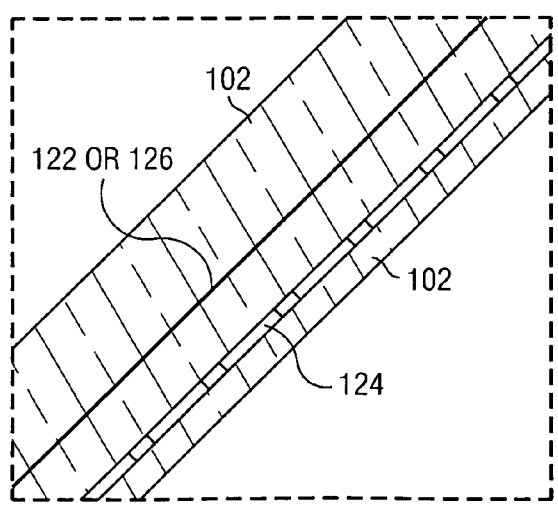
FIG. 6 illustrates an embodiment where one polarization manipulating film is internal to the windshield.

FIG. 5-6 illustrate embodiments that have both or one of the polarization manipulating films 122, 126 between the windshield glass plates 102. For safety, windshields 102 are made of two glass plates with a central polymer film to avoid the glass disintegrating in an accident. This polymer could be replaced with a laminate film as in the previous embodiment as shown in FIG. 5. Additionally, the second polarization manipulating film 126 could be a stretched version of the polymer already used as a central film within a windshield 102 as illustrated in FIG. 6.

It will be appreciated by those of ordinary skill in the art that the invention can be embodied in other specific forms without departing from the spirit or essential character thereof. For example, instead of the windshield, driver and passenger side windows or the sunroof may be modified to project images and displays. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A windshield for manipulating optical polarization in a head-up display system, the head-up display system comprising a projection light source, the windshield comprising:
    a first polarization manipulating layer operable to transform a polarization state of light;
    a thin film layer adjoining the first polarization manipulating layer;
    a second polarization manipulating layer adjoining the thin film layer, the second polarization manipulating layer being operable to transform a polarization state of light; and
    a transparent substrate layer adjoining the second polarization manipulating layer;
    wherein a first material interface is defined by the thin film layer and the first polarization manipulating layer, a second material interface is defined by the thin film layer and the second polarization manipulating layer, the first and second material interfaces each being operable to transmit and reflect a portion of the light from the projection light source; and
    wherein the first and second polarization manipulating layers each comprise half wave retarders.

2. The windshield of claim 1, wherein the orientations of the first and second half wave retarders are orthogonal.

3. A windshield for manipulating optical polarization in a head-up display system, the head-up display system comprising a projection light source, the windshield comprising:
    a first polarization manipulating layer operable to transform a polarization state of light;
    a thin film layer adjoining the first polarization manipulating layer;
    a second polarization manipulating layer adjoining the thin film layer, the second polarization manipulating layer being operable to transform a polarization state of light; and
    a transparent substrate layer adjoining the second polarization manipulating layer
    wherein a first material interface is defined by the thin film layer and the first polarization manipulating layer, a second material interface is defined by the thin film layer and the second polarization manipulating layer, the first and second material interfaces each being operable to transmit and reflect a portion of the light from the projection light source; and
    wherein at least one layer is adjoined to a neighboring layer with an index-matching material therebetween.

4. The windshield of claim 3, wherein the index-matching material is an index-matching adhesive.

5. The windshield of claim 3, wherein the transparent substrate layer comprises glass, plastic, or a laminated combination of glass and plastic.

6. A windshield for manipulating optical polarization in a head-up display system, the head-up display system comprising a projection light source, the windshield comprising:
    a first polarization manipulating layer operable to transform a polarization state of light;
    a thin film layer adjoining the first polarization manipulating layer;
    a second polarization manipulating layer adjoining the thin film layer, the second polarization manipulating layer being operable to transform a polarization state of light; and
    a transparent substrate layer adjoining the second polarization manipulating layer;
    wherein a first material interface is defined by the thin film layer and the first polarization manipulating layer, a second material interface is defined by the thin film layer and the second polarization manipulating layer, the first and second material interfaces each being operable to transmit and reflect a portion of the light from the projection light source; and
    wherein the thin film layer is operable to reflect s-polarized light and transmit p-polarized light.

7. A film for manipulating optical polarization for a head-up display application, the film comprising a layer structure operable to affix to a transparent substrate, the film further comprising:
    a first polarization manipulating layer operable to receive polarized light from the head up display and transform the polarization state to an orthogonal state of polarization;
    a thin film layer adjoining the first polarization manipulating layer, the thin film layer operable to transmit and reflect a portion of the orthogonally polarized light from the first polarization manipulating layer;

a second polarization manipulating layer with a first side adjoining the thin film layer and a second side operable to affix to the transparent substrate, the second polarization manipulating layer operable to transform the polarization state of the light from the thin film layer to an orthogonal state of polarization; and wherein the first and second polarization manipulating layers each comprise half wave retarders.

8. The film of claim 7, wherein the orientations of the first and second half wave retarders are orthogonal.

9. A film for manipulating optical polarization for a head-up display application, the film comprising a layer structure operable to affix to a transparent substrate, the film further comprising:

a first polarization manipulating layer operable to receive polarized light from the head up display and transform the polarization state to an orthogonal state of polarization;

a thin film layer adjoining the first polarization manipulating layer, the thin film layer operable to transmit and reflect a portion of the orthogonally polarized light from the first polarization manipulating layer;

a second polarization manipulating layer with a first side adjoining the thin film layer and a second side operable to affix to the transparent substrate, the second polarization manipulating layer operable to transform the polarization state of the light from the thin film layer to an orthogonal state of polarization; and wherein at least one layer is adjoined to a neighboring layer with an index-matching material therebetween.

10. The film of claim 9, wherein the index-matching material is an index-matching adhesive.

11. A film for manipulating optical polarization for a head-up display application, the film comprising a layer structure operable to affix to a transparent substrate, the film further comprising:

a first polarization manipulating layer operable to receive polarized light from the head up display and transform the polarization state to an orthogonal state of polarization;

a thin film layer adjoining the first polarization manipulating layer, the thin film layer operable to transmit and reflect a portion of the orthogonally polarized light from the first polarization manipulating layer;

a second polarization manipulating layer with a first side adjoining the thin film layer and a second side operable to affix to the transparent substrate, the second polarization manipulating layer operable to transform the polarization state of the light from the thin film layer to an orthogonal state of polarization; and wherein the thin film layer is operable to reflect s-polarized light and transmit p-polarized light.

12. A windshield for manipulating optical polarization in a head-up display system, the head-up display system comprising a projection light source, the automotive windshield comprising:

a first polarization manipulating layer operable to transform a polarization state of light from the projection light source;

an air space layer adjacent to the first polarization manipulating layer;

a second polarization manipulating layer adjacent to the air space layer, the second polarization manipulating layer operable to transform a polarization state of light from the projection light source; and a glass layer adjacent to the second polarization manipulating layer;

wherein a first material interface is defined by the air space layer and the first polarization manipulating layer, a second material interface is defined by the air space layer and the second polarization manipulating layer, the first and second material interfaces each being operable to transmit and reflect a portion of the light from the projection light source, wherein the first and second polarization manipulation layers are disposed in parallel planes.

13. The windshield of claim 12, wherein the air space layer is maintained by at least one spacer between the first and second polarization manipulating layers.

14. The windshield of claim 13, wherein the at least one spacer separates the first and second polarization manipulating layers in a range between 0.01 and 0.1 mm apart.

15. The windshield of claim 3, wherein the first polarization manipulating layer transforms polarized light by 90°.

16. The windshield of claim 15, wherein the second polarization manipulating layer transforms polarized light by 90°.

17. The windshield of claim 6, wherein at least one layer is adjoined to a neighboring layer without an index-matching material.

* * * * *